US006547870B1

(12) United States Patent
Griessmann et al.

(10) Patent No.: US 6,547,870 B1
(45) Date of Patent: Apr. 15, 2003

(54) PIGMENT PREPARATION

(75) Inventors: Carsten Griessmann, Deutschland (DE); Gerhard Herget, Deutschland (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 0 days.

(21) Appl. No.: 09/719,479

(22) PCT Filed: Jun. 11, 1999

(86) PCT No.: PCT/EP99/04016

§ 371 (c)(1),
(2), (4) Date: Dec. 13, 2000

(87) PCT Pub. No.: WO99/65995

PCT Pub. Date: Dec. 23, 1999

(30) Foreign Application Priority Data

Jun. 18, 1998 (DE) .......................................... 198 26 624

(51) Int. Cl.$^7$ ................................................ C09C 3/04
(52) U.S. Cl. ...................... 106/417; 106/415; 106/416; 106/418; 106/439; 106/445; 106/446; 106/447; 106/457; 106/482; 106/487; 106/490; 106/491; 106/499; 106/501.1; 106/504; 106/31.6; 106/31.67; 106/31.69; 106/31.9; 428/403; 428/404; 428/407; 524/437; 524/447; 524/449
(58) Field of Search ................................ 106/415, 416, 106/417, 418, 439, 445, 446, 447, 457, 482, 487, 490, 491, 499, 501.1, 504, 31.6, 31.67, 31.69, 31.9; 428/403, 404, 407; 524/437, 442, 447, 449

(56) References Cited

U.S. PATENT DOCUMENTS

| 4,221,601 | A | * | 9/1980 | Augustin et al. | ......... 106/175.1 |
| 4,772,331 | A | * | 9/1988 | Noguchi et al. | ............. 106/415 |
| 5,228,912 | A | * | 7/1993 | Herget et al. | ................ 106/417 |
| 5,530,043 | A | * | 6/1996 | Zawacky et al. | ............ 524/308 |
| 5,993,526 | A | * | 11/1999 | Sommer et al. | ......... 106/31.65 |
| 6,277,188 | B1 | * | 8/2001 | Salter et al. | ................. 106/403 |
| 6,312,513 | B1 | * | 11/2001 | Hoefer et al. | ................ 106/413 |

FOREIGN PATENT DOCUMENTS

| DE | 3132303 | 2/1983 |
| DE | 19614636 | 10/1997 |
| DE | 19708167 | 9/1998 |
| EP | 0220617 | 5/1987 |
| EP | 0515928 | 12/1992 |
| EP | 0803552 | 10/1997 |
| EP | 0832943 | 4/1998 |
| JP | 5039448 | 2/1993 |

* cited by examiner

*Primary Examiner*—Anthony J. Green
(74) *Attorney, Agent, or Firm*—Millen, White, Zelano & Branigan, P.C.

(57) ABSTRACT

The invention relates to a non-dusting, homogeneous pigment preparation, comprising ≧40% by weight of one or more effect pigments, 0.5–60% by weight of a polyalkylene glycol and/or one or more polyalkylene glycol derivatives, 0–10% by weight of a redispersing auxiliary, 0–40% by weight of water or an organic solvent or solvent mixture, 0–40% by weight of at least one further hydroxyl-rich resin, and to its use as a precursor for printing inks.

17 Claims, No Drawings

PIGMENT PREPARATION

The invention relates to a non-dusting homogeneous pigment preparation and to its use as a precursor for printing inks.

In industrial processes, pigments are seldom employed in the form of dry powders, since the latter produce dust, which leads to increased requirements in terms of workplace safety. In many cases, furthermore, when introducing powders into plastics, basecoat systems, etc., agglomeration of the pigment powder is observed. Homogeneous distribution of the pigment in the respective matrix is frequently difficult if not impossible to achieve.

Instead of the pigment powder, non-dusting pigment formulations are used. These formulations are:
- free-flowing powders where pearl lustre pigments are coated with polymers, as described for example in DE-C-2603211,
- pigmented free-flowing powders with a low moisture content, as known, for example, from DE-A-4139993,
- pigmented powders having a higher moisture content, which owing to their flowable consistency are also frequently referred to as pastes, or
- dry preparations as precursors for printing inks, as are known for example in EP 0 803 552.

Pastes, and dry preparations prepared from them, are a technical alternative to the dry or moistened powders provided they meet the following general conditions:
- flowable consistency
- minimal dilatancy
- maximum pigment content The components of the preparation/paste should be chosen so that the formulation is customized to suit the other components of the respective coating system as closely as possible and is readily homogeneously distributed following its introduction.

In addition to good compatibility with the other constituents of the coating system, pigment preparations are required to exhibit high stability; that is, they must not tend towards phase separation.

This requirement is particularly important in the case of pigment granules based on platelet-shaped pigments, since owing to their structure such pigments have a tendency to cake together on phase separation and are difficult to reagitate. Pigments based on platelet-shaped substrates give rise to handling problems insofar as, owing to the size and density of the pigments, they readily settle and then may cake together to form a very firm sediment cake. This cake is generally difficult to reagitate. This is particularly so in connection with the storage of varnishes, paints and printing inks and their processing.

Therefore, numerous methods have been developed, inter alia, in order to solve the problem of the incorporation and handling of platelet-shaped pigments in coating compositions. Reagitation can be facilitated by treating the coating compositions with additives which alternatively bring about controlled flocculation (house of cards effect), pseudoplastic and/or thixotropic behaviour, or steric and/or electrostatic repulsion of the pigments. However, these additives may have an adverse effect on the quality of the coating. In particular, the brightness in the case of effect pigments, and the uniformity of the coating, may be impaired.

In addition, homogeneous stable distribution of the redispersants in the pearl lustre pigment powder is difficult to achieve, and/or the redispersant loses some of its activity in the course of mixing.

The effect pigment formulations that have been developed to date for use in coating systems, with a pigment content of >30% by weight, frequently fail to go far enough towards meeting the requirements described, especially since they have a tendency towards agglomeration and shear thickening.

The object of the present invention was therefore to provide a pigment preparation, especially in the form of pastes and dry preparations, which can be used to very good effect in aqueous coating systems, possesses high stability, is readily redispersed, and at the same time features a high level of compatibility with the other components of the coating system. Furthermore, the pigment preparation of the invention ought also to be suitable for producing dry preparations in the form, for example, of pellets, granules, etc.

Surprisingly it has been found that this object can be achieved by the provision of the pigment preparation of the invention.

The invention therefore provides a non-dusting homogeneous pigment preparation which comprises

| | |
|---|---|
| ≧40% | by weight of one or more effect pigments, |
| 0.5–60% | by weight of a polyalkylene glycol and/or one or more polyalkylene glycol derivatives, |
| 0–10% | by weight of a redispersing auxiliary, |
| 0–40% | by weight of water or an organic solvent or solvent mixture, |
| 0–40% | by weight of at least one further hydroxyl-rich resin. |

Depending on its moisture content, the preparation of the invention is a flowable paste or a moistened free-flowing powder. Both paste and powder are highly suited to the production of dry preparations, examples being pellets, granules and briquettes. The dry preparations produced lrom the pigment formulation of the invention are likewise provided by the invention.

The effect pigments used are preferably commercially customary metal-effect pigments, such as aluminium flakes, e.g. Stapa-Alupaste® or Standart from Eckart, Paliochrom® from BASF, platelet-shaped iron oxide, BiOCl, holographic pigments, and also pigments based on platelet-shaped, transparent or semi-transparent substrates of, for example, phyllosilicates, such as mica, synthetic mica, $SiO_2$ flakes, $TiO_2$ flakes, $Al_2O_3$ flakes, glass flakes, graphite flakes, talc, sericite, kaolin or other silicatic materials which are coated with coloured or colourless metal oxides, such as $TiO_2$, titanium suboxides, titanium oxinitrides, $Fe_2O_3$, $Fe_3O_4$, $SnO_2$, $Cr_2O_3$, ZnO, CuO, TiO and other metal oxides, alone or in a mixture, in one uniform layer or in successive layers (multilayer pigments). Pearl lustre pigments are known, for example, from the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602 32 35 017 and P 38 42 330 and are obtainable commercially, for example under the brand name Iriodine® from Merck KGBA, Darmstadt, FRG. Particularly preferred pigment granules comprise $TiO_2$/mica, $Fe_2O_3$/mica and/or $TiO_2$/$Fe_2O_3$ mica pigments. The $SiO_2$ flakes can be coated, for example, as described in WO 93/08237 (wet-chemical coating) or DE-A 196 14 637 (CVD process).

The pigment preparations of the invention can comprise one or more effect pigments. In many cases it is possible by using at least two different effect pigments to obtain special colour effects and lustre effects. Preferred pigment granules comprise one or more effect pigments based on mica and/or SiO$_2$ flakes.

It is also possible to mix in conventional (organic or inorganic) colour pigments and also carbon black and/or TiO$_2$.

The pigment formulation of the invention comprises preferably 50–95 t by weight of effect pigments, especially 60–80% by weight. Very particular preference is given to pigment granules having an effect pigment content of more than 50% by weight.

As a mandatory component the pigment preparation of the invention comprises a polyalkylene glycol and/or an appropriate derivative in amounts of from 0.5 to 60% by weight, preferably from 5 to 40% by weight and, in particular, from 10 to 30% by weight. All polyalkylene glycols or derivatives thereof that are known to the person skilled in the art can be used. Polyethylene glycol, polypropylene glycol and their esters and ethers are particularly suitable, as are described, for example, in "Encyclopaedia of Polymer Science and Engineering", a Wiley-Interscience Publication, John Wiley & Sons.

Furthermore, it is often advisable to mix in hydroxyl-rich resins, examples being cellulose products such as carboxycellulose and its ethers and esters, polyvinyl alcohol, polysaccharides and polyvinyl acetate, in amounts of from 0–50% by weight. All hydroxyl-rich resins known to the person skilled in the art are suitable, especially those specified in Karsten, Lackrohstofftabellen, 8th edition 1987.

As a further component the pigment formulation of the invention can comprise a redispersing auxiliary, preferably spherical particles, a polyacrylate or polymethacrylate, or fibriform particle having a fibre length of 0.1–20 μm, in amounts of from 0 to 10% by weight, preferably from 0.05 to 5% by weight and, in particular, from 0.01 to 3% by weight, based on the pigment.

The addition of a redispersing auxiliary in the form of bulky particles, such as fibres or spherical particles, for example, prevents the effect pigments treated in accordance with the process of the invention from lying on top of one another to a notable extent as a result of the steric repulsion and so exerting strong adhesion. The effects of this are that 1. the preparations of the invention are more stable,
2. owing to the introduction of the redispersing auxiliary into the varnish or paint system by way of the pigment preparation, the effect pigments undergo in some cases very much slower settling in varnish and paint systems, and
3. in all cases, the sediment is less hard, and no problems occur on reagitation of the sediment.

All organic and inorganic fibres that are known to the person skilled in the art and have a fibre length of 0.1–20 μm can be used. Particularly suitable particles are all synthetic fibres made, for example, from polyethylene, polyacrylates, polypropylene, polyamides, cellulose fibres, inorganic fibres, and preferably silicone compounds, glass fibres and, in particular, the condensation products of modified isocyanates and mono- and diamines.

These condensation products, which are diurea derivatives and also amino ureas with urethane groups are known as thixotropic agents and, together with a binder, are added to paints and varnishes in order to improve the running properties and the brushability.

Redispersing auxiliaries which can be used are all diurea derivatives and urethane compounds known to the person skilled in the art, as are described, for example, in EP 0 198 519, in DE 18 05 693 and in Organic Coatings: Science and Technology, A. Heenriga, P. J. G. von Hemsbergen, pp. 201–222, N.Y. 1983.

Suitable spherical materials are, in particular, hollow glass, wax or polymer beads made from vinyl resins, nylon, silicon, epoxy resins, olefin resins or polystyrenes, and inorganic materials, such as TiO$_2$, SiO$_2$ or ZrO$_2$, for example. Preference is given to the use of hollow beads, and also solid beads, having a particle size of from 0.05 to 150 μm. With particular preference, hollow glass, wax or polymer beads are employed in the pigment granules of the invention.

Spherical particles based on SiO$_2$ in a particle range of 3–10 m are known, for example, as materials for high-performance liquid chromatography and are marketed, for example, as LiChrospher® by Merck KGaA, Darmstadt, FRG. Such materials are preferably employed in monodisperse form, that is, with a substantially uniform particle size. Monodisperse spherical particles of this type based on SiO$_2$, TiO$_2$ and ZrO$_2$ are known. Monodisperse SiO$_2$, for example, can be prepared in accordance with DE 36 16 133. Hollow glass beads are marketed, for example, under the trade name Q-CEL by PQ Corporation, USA or Scotchlite by 3M, Frankfurt, FRG.

In addition, the preparation may comprise surface-active substances, such as alkylsilanes, which may also contain a further functional group, unsaturated or saturated fatty acids, or fluorosurfactants. Particular preference is given to the use of silane compounds of the formula $(C_nH_{2n+1})$ Si $(OC_mH_{2m+1})_3$, in which n is 1–30 and m is 1–10, as surface-active substances. Examples of suitable silane compounds are n-hexyldecyltriethoxysilane and n-octyldecyltriethoxylsilane (Si 116 and Si 118, respectively, from Degussa AG, Frankfurt, FRG), and also the corresponding fluoroalkylsilanes.

Further surface-active substances which can be employed are the saturated and unsaturated fatty acids, such as caproic, caprylic, capric, lauric, myristic, palmitic, stearic, oleic and linoleic acid, and also mixtures of fatty acids.

In addition to the silane, the pigment preparation preferably also comprises a surfacrant or a fatty acid. The surface-active reagent may also be a mixture of silane, fatty acids and/or surfactants. The pigment preparation can comprise from 0.1 to 5% by weight, preferably from 0.2 to 3% by weight and, in particular, from 0.5 to 2% by weight of surface-active substances, based on the pigment.

The pigment preparation of the invention may additionally comprise from 0 to 40% by weight of water or an organic solvent or solvent mixture, preferably from 5 to 35% by weight and, in particular, from 10 to 30% by weight.

The solvent component in the pigment preparation of the invention must be expertly tailored to the polyalkylene glycol that is used. For the preparation it is possible to employ all organic solvents, especially those which are miscible with water. Suitable solvents are, for example, aromatic solvents, such as toluenes, petroleum spirits, mineral oils, hydrocarbons, esters, long-chain amines, vegetable oils, monohydric aliphatic alcohols, such as those having 2 to 4 carbon atoms, examples being ethanol, butanol and isopropanol, or ketones, such as acetone or methyl ethyl ketone, or glycol ethers, such as propylene glycol monoethyl ether, or diols, such as ethylene glycol and propylene glycol or polyetherdiols, aliphatic triols and tetrols with 2 to 6 carbon atoms, such as trimethylolethane, trimethylolpropane, glycerol, 1,2,4-butanetriol, 1,2,6-hexanetriol and pentaerythritol, and also all other solvents from other classes of compound, and/or mixtures of the abovementioned solvents. Preference is given to the use of those solvents listed in Karsten, Lackrohstofftabellen, 8th edition, 1987.

The pigment preparation of the invention is produced by adding the polyalkylene glycol and/or the polyalkylene glycol derivative, water if required, the redispersing auxiliary, and any further additives simultaneously or in succession to the effect pigment or effect pigment mixture and gently homogenizing this mixture in a mixer. The mixers are not critical, but dispermats, granulating mixers and blade mixers.

Preferably, the pigment is introduced initially and is first pasted up, while stirring, with the solvent containing the polyalkylene glycol and possibly at this stage the redispersant; next, if desired, a further solution consisting of solvent, additives and the redispersing auxiliary is added. It desired, a first drying stage can be carried out even at this point, in which case the drying temperature can be between 80 and 150°C.

During its preparation or after it has been prepared, further customary additives can be added to the pigment preparation of the invention, examples being pH regulators, defoamers, wetting agents, anti-settling agents, levelling agents, siccatives and thixotropic agents. These are auxiliaries customary in the coatings industry, which may be present in the pigment preparation of the invention in an amount from 0 to 10% by weight.

The resultant pigment preparation of the invention is a homogeneous powder or readily flowable paste having a relatively high effect pigment content. Because of the particularly high level of compatibility of the hydroxy resin, the pigment preparation of the invention is likewise thoroughly compatible with customary commercial systems.

Further distinguishing features of the preparation are its freedom from dust, ready dispersibility and redispersibility, high storage stability and good processing properties, and it is therefore markedly superior to conventional pigment preparations.

The flowable pigment preparation is very well suited to the filling of tubes, and for extrusion. In order to produce dry preparations, the pigment granules of the invention are extruded or compressed into a compact particulate form by other means known to the person skilled in the art—for example, by tableting, briqueting, pelletizing, granulating, spray-granulating or extrusion—and may then be dried.

The processes referred to are known to the person skilled in the art and are described in "Size Enlargement by Agglomeration", Wolfgang Pietsch, John Wiley & Sons, Chichester, N.Y., Brisbane, Toronto, Singapore 1991.

When the pigment preparation or paste is pressed through a perforated plate, which is done either batchwise by means of pistons or continuously through an extruder, particles in sausage form are produced. By appropriately adjusting the viscosity of the preparation it can be ensured that the length of the particles is regulated automatically as a result of breaking off or tearing off on emergence from the perforated plate. The separation of the paste extrudates emerging from the perforated plate, to form particles, can alternatively be done by known mechanical means, for example by rotating separation blades. Pelletization or granulation takes place in a known manner on pelletizing plates or in granulating vessels and generally results in spherical particles of the preparation.

The preparation of pigment granules by way of plates or drums may be advantageous in certain cases in order to ensure that only a minimum of auxiliary solvent and/or water is used. The pigment preparations used as starting material for this purpose are generally moistened powders, which in some cases may already be in granulated form, and with the further process step are used merely like the desired defined particles.

The particles produced firstly by pressing through a perforated plate can subsequently be shaped further by pelletization or granulation. Tableting or briqueting takes place by pressing the paste in appropriate moulds.

The process of drying the particles produced by compacting takes place generally at temperatures from 20 to 150° C., lasts for between 0.5 and 4 h and can be carried out, if desired, under reduced pressure. First of all, the dry preparation is classified or comminuted if desired. The granules obtained in this way, for example, are likewise non-dusting and have particle sizes in the range 0.1–150 mm, preferably 0.1–20 mm and, in particular, 0.1–2 mm. The storage and transportation of the dry preparations are not subject to any great restriction and are therefore highly unproblematic. The dry preparations possess the further advantage that they carry little or no liquid and therefore possess increased stability and compatibility.

The dry preparation can also be prepared in the absence of water and/or solvents by processing the resin and other components with the pigment at increased temperature to form a flowable or free-flowing melt and producing granules from this melt by forming drops, by centrifugation or by the use of granulating plates or drums.

The pigment granules can also be admixed with substances which assist or accelerate the breakdown and dissolution of the pigment granules, examples being bulky spherical particles, such as hollow beads, or half beads, or substances which dissolve very rapidly in the application medium, or swell and in that way "burst" the granules.

These dry preparations can be incorporated into all of the binders known to the person skilled in the art for varnishes, paints and printing inks, especially aqueous solvent-free (UV) and also solvent-based systems.

Owing to the good compatibility of the polyalkylene glycols and derivatives thereof, suitable binder resins are those which are commonly added to paints and varnishes and are listed, for example, in Karsten, Lackrohstofftabellen, 8th edition, 1987. Suitable binders are all of those binders or binder mixtures that are customarily used for printing inks, examples being those based on cellulose, polyacrylate, polymethacrylate, alkyd, polyester, polyphenol, urea, melamine, polyterpene, polyvinyl, polyvinyl chloride and polyvinylpyrrolidone resins, polystyrenes, polyolefins, indene-coumarone, hydrocarbon, ketone, aldehyde and aromatic-formaldehyde resins, carbamic acid resins, sulfonamide resins and epoxy resins, polyurethanes and/or natural oils or derivatives of the substances mentioned. The effect pigment preparation of the invention has been found to exhibit particularly good redispersibility when cellulose and/or cellulose compounds are employed as binders.

The integration of a redispersing aid ensures that, even in the finished varnish and paint systems, the pigment granules of the invention are readily reagitatable and require no further improvement by the end formulator.

The improved deagglomeration of the dry preparations incorporated into a binder, such as into a printing ink, for example, is evident even with small amounts of spherical particles in the pigment granules. For instance, even when using granules having a spherical particle content of 0.5% by weight, based on the dry pigment, the dissolution rate is markedly increased and the printing ink becomes stable (viscosity/hue) more quickly.

As a paste or as dry granules, the preparation of the invention can be used for a variety of applications. It is preferably employed in coating systems from the sectors of printing, especially offset printing, flexographic printing and intaglio printing, print varnishing and screen printing. With particular preference, the granules are applied, as a precursor for coating compositions, to any desired substrate materials, examples being metals such as iron, steel, aluminium, copper, bronze, brass and also metal foils, and metal-clad surfaces of glass, ceramic and concrete, and on wood, such as furniture, for example, clay, textile, paper, packaging materials, for example plastic containers, films or card, or on other materials for decorative and/or protective purposes.

The invention therefore also provides for the use of the pigment preparation, as a paste or as a dry preparation, in formulations such as paints, varnishes, printing inks and plastics.

The examples which follow are intended to illustrate the invention without, however, restricting it.

EXAMPLES

Example 1

In a mixing granulator, R02 from Eirich, 1000 g of Iriodin® ($TiO_2$/mica pigment of particle size 5 to 20 µm from Merck KGBA) and a solution of 250 g of polyethylene glycol 4000 (Merck KGaA) in 250 g of fully deionized water are mixed homogeneously. Further fully deionized water is used to adjust the particle size of the granules to about 2 m. The resultant granules are dried at 120° C. for 24 hours.

Example 2

Polyethylene glycol 4000 (Merck KGBA), fully deionized water and Iriodin 123 (Merck) ($TiO_2$/mica pigment of particle size 5 to 20 =m from Merck KGaA) are mixed homogeneously (5 minutes, composition as in Experiment 1) in the R02 mixer and the mixture is then granulated continuously on a TR4 plate granulator, The resultant granules are dried in a fluidized bed and then classified using a sieve. This results in a coarse fraction (>2 mm) 7.25%, a fine fraction (>10 µm) 0.43%, and the desired fraction 92.75%. The coarse and fine fractions can be recycled to the process.

Example 3

In accordance with Experiments 1 and 2, the target particle size is varied. Particles of the desired fraction with diameters of 0.8 mm and 1.4 mm, respectively, are obtained.

Example 4

The granules obtained in Experiment 2 are incorporated into an aqueous binder (combined polyacrylate resin/polyacrylate dispersion, Merck KGaA) and tested for their suitability for printing (Saueressig manual drawing instrument). The following table indicates the results:

| Specif. Iriodin ® 123 Upper particle limit (mm) | Powder (Comparison) | Granules 0.8 | Granules 1.4 | Granules 2.0 |
|---|---|---|---|---|
| Ink Pigment formulation (g) | 30 | 3.75 | 37.5 | 37.5 |
| Binder | 70 | 62.5 | 62.5 | 62.5 |
| Fully deionized water | 20 | 20 | — | — |
| Isopropanol/water 1:1 | — | — | 15 | 20 |
| Viscosity (4 mm cup) (seconds) | 24 | 53 | 24 | 30 |
| Dissolution time (seconds) | 105 | 90 | 150 | 240 |

The granules have the following advantages: The volume reduces to about ⅓ of the initial volume. This leads to advantages in terms of logistics (storage and transportation).

Relative to the powder, the granules are readily meterable, free-flowing and non-dusting. They can be incorporated in a comparable time and, in contrast to the powder mixture, immediately achieve ink equilibrium (constant viscosity). The foaming behaviour is optimal. The Saueressig prints exhibit a very good homogeneous printed image which has much less texture than when the pigment powder is used. The printed sheets obtained have the required fastness values and also meet the requirements for adhesive-tape adhesion and abrasion resistance.

Example 5

In accordance with Example 2, 300 g of polyethylene glycol 2000 (Merck KGaA, Darmstadt), 300 g of fully deionized water and 1000 g of Iriodin® 100 ($TiO_2$/mica pigment of particle size 10–60 µm) are homogeneously mixed, granulated, classified wet to an upper Limit, and dried in a fluidized bed to a residual moisture content of 0.5%. The resulting granules are rapidly dissolvable in aqueous, solvent-free (UV) and solvent-based binders and immediately produce a stable formulation with an optimum pearl lustre effect. The granules are non-dusting and readily free-flowing.

Example 6

In accordance with Example 2, 2000 g of Stapa Offset 2000 Silber (Eckart Werke, Furth, a formulation in white spirit with a metal content of 63% by weight) silver are mixed with a solution of 70 g of polyethylene glycol 2000 (Merck KGaA) in 70 g of methyl ethyl ketone, the mixture is granulated and the granules are dried under vacuum to a residual moisture content of 0.5%. The resulting granules are free-flowing and readily meterable and lend themselves very well to incorporation into solvent-based and solvent-free (UV) ink systems.

What is claimed is:

1. A non-dusting, homogeneous pigment composition, comprising: ≧40% by weight of one or more effect pigments comprising at least one metal flake pigment, platelet-shaped iron oxide pigment, BiOCl pigment, holographic pigment or other pigment having a transparent or semi-transparent platelet-shaped substrate coated with one or more layers of one or more metal oxides, 0.5–60% by weight of a polyalkylene glycol and/or one or more polyalkylene glycol derivatives, 0–10% by weight of a redispersing auxiliary, 0–40% by weight of water, one or more organic solvents or mixtures thereof, and 0–40% by weight of at least one hydroxyl group-containing resin selected from the group consisting of cellulose products, polyvinyl alcohols, polysaccharides and polyvinyl acetates.

2. The composition of claim 1, wherein the effect pigment comprises a pigment based on a platelet-shaped mica or $SiO_2$ substrate coated with one or more layers of one or more metal oxides.

3. The composition of claim 2, herein the effect pigment is platelet-shaped mica coated with $TiO_2$ and/or $Fe_2O_3$.

4. The composition of claim 2, wherein the effect pigment is platelet-shaped $SiO_2$ coated with $TiO_2$ and/or $Fe_2O_3$.

5. The composition of claim 1, wherein the effect pigment comprises a pigment based on a platelet-shaped form of mica, synthetic mica, $SiO_2$ flake, $TiO_2$ flake, $Al_2O_3$ flake, glass flake, graphite flake, talc, sericite, or kaolin coated with one or more layers of one or more metal oxides selected from the group consisting of $TiO_2$, titanium suboxides, titanium oxinitrides, $Fe_2O_3$, $Fe_3O_4$, $SnO_2$, $Cr_2O_3$, ZnO, CuO and NiO.

6. The composition of claim 1, which comprises 50–95% by weight of the effect pigment.

7. The composition of claim 1, which comprises a polyalkylene glycol which is polyethylene glycol or polypropylene glycol.

8. The composition of claim 1, which comprises a polyalkylene glycol derivative which is an ether or ester of polyethylene glycol or polypropylene glycol.

9. The composition of claim 1, which comprises 5–40% by weight of the polyalkylene glycol and/or one or more polyalkylene glycol derivatives.

10. The composition of claim 1, which contains 0.05–10% by weight of at least one redispersing auxiliary.

11. The composition of claim 10, wherein the redispersing auxiliary is selected from the group consisting of a polyacrylate, a polymethacrylate, spherical particles and fibriform particles having a fiber length of 0.1–20 $\mu$m.

12. The composition of claim 1, further comprising at least one defoamer, surface-active agent, wetting agent, anti-settling agent, leveling agent, siccative or thixotropic agent.

13. A composition of claim 1, which is in the form of solvent-free, free-flowing granules with a particle size from 0.2 to 80 mm.

14. A dry pigment particle produced from the composition of claim 1 by tableting, briqueting, pelletizing, granulating, spray-granulating or extruding the composition.

15. A dry pigment particle produced from the composition of claim 1 without the addition of further water or solvent, wherein the composition is heated to provide a flowable or free-flowing melt and granules are produced from the melt by drop formation, centrifugation or by the use of a granulating disc or granulating drum.

16. A paint, varnish, printing ink, or plastic containing a pigment composition according to claim 1.

17. An offset or intaglio printing ink containing a pigment composition according to claims 1.

* * * * *

UNITED STATES PATENT AND TRADEMARK OFFICE
CERTIFICATE OF CORRECTION

PATENT NO. : 6,547,870 B1
DATED : April 15, 2003
INVENTOR(S) : Griessmann et al.

It is certified that error appears in the above-identified patent and that said Letters Patent is hereby corrected as shown below:

Title page,
Item [75], "Deutschland" (first occurrence) should read -- Ober-Ramstadt --; and "Deutschland" (second occurrence) should read -- Gross-Zimmern --.

Column 9,
Line 7, "herein" should read -- wherein --.

Column 10,
Line 27, "claims" should read -- claim --.

Signed and Sealed this

Fifteenth Day of June, 2004

JON W. DUDAS
*Acting Director of the United States Patent and Trademark Office*